United States Patent [19]

Eisen et al.

[11] Patent Number: 5,269,986
[45] Date of Patent: Dec. 14, 1993

[54] PROCESS FOR THE PRODUCTION OF BACK FOAMED INTERNAL PARTS FOR REFRIGERATION FURNITURE

[75] Inventors: Norbert Eisen, Cologne; Robert Zöllner, Leverkusen; Wolfgang Henning, Kuerten; Reinhold Dederichs, Leverkusen, all of Fed. Rep. of Germany

[73] Assignee: Bayer Aktiengesellschaft, Leverkusen, Fed. Rep. of Germany

[21] Appl. No.: 686,572

[22] Filed: Apr. 17, 1991

[30] Foreign Application Priority Data

Apr. 28, 1990 [DE] Fed. Rep. of Germany ....... 4013712

[51] Int. Cl.$^5$ .............................................. B29C 67/22
[52] U.S. Cl. .................................. 264/46.4; 264/46.5; 264/46.6; 264/46.8; 264/53; 264/255
[58] Field of Search ............... 264/46.4, 46.5, 46.6, 264/46.8, 255, 53

[56] References Cited

U.S. PATENT DOCUMENTS

| | | | |
|---|---|---|---|
| 3,137,744 | 6/1964 | Burrus | 264/46.5 |
| 3,209,056 | 9/1965 | Jacobs | 264/46.5 |
| 3,440,308 | 4/1969 | Carbary et al. | 264/46.5 |
| 3,773,552 | 11/1973 | Bird et al. | 428/516 |
| 4,005,919 | 2/1977 | Hoge et al. | 312/214 |
| 4,048,274 | 9/1977 | Hoge et al. | 264/46.5 |
| 4,107,833 | 8/1978 | Knight et al. | 264/46.5 |
| 4,209,564 | 6/1980 | Nomura et al. | 264/46.6 |
| 4,293,659 | 10/1981 | Svoboda | 264/255 |
| 4,294,880 | 10/1981 | Nishida | 264/255 |
| 4,644,017 | 2/1987 | Haas et al. | 427/385.5 |
| 5,035,833 | 7/1991 | Ogawa et al. | 252/182.24 |

FOREIGN PATENT DOCUMENTS

| | | |
|---|---|---|
| 0161477 | 11/1985 | European Pat. Off. . |
| 1546832 | 4/1970 | Fed. Rep. of Germany . |
| 1328222 | 7/1962 | France . |
| 1476371 | 6/1977 | United Kingdom . |
| 1234216 | 6/1991 | United Kingdom . |

*Primary Examiner*—Allan R. Kuhns
*Attorney, Agent, or Firm*—Joseph C. Gil; Lyndanne M. Whalen

[57] ABSTRACT

Refrigeration units having internal parts containing a rigid polyurethane foam formed without the use of perhalogenated fluoro-chlorohydrocarbons are produced by applying a coating to the internal walls of the part in which back-foaming will take place, pouring a foam forming reaction mixture into the cavity of the part in which the internal walls have been coated and allowing the foam to form and set. The coating applied to the internal walls of the part in which back foaming is to be carried out is selected from one-component chemically cross-linking lacquers, two-component chemically cross-linking lacquers and lacquers based on aqueous polyurethane dispersions. The foam forming mixture generally includes a polyisocyanate, a polyisocyanate-reactive compound and a blowing agent. The blowing agent must include a partially halogenated hydrocarbon having at least one carbon-hydrogen bond and a boiling point in the range of from about $-50°$ to about $50°$ C.

2 Claims, No Drawings

PROCESS FOR THE PRODUCTION OF BACK FOAMED INTERNAL PARTS FOR REFRIGERATION FURNITURE

BACKGROUND OF THE INVENTION

The present invention relates to a new process for the production of back foamed, deep drawn plastics useful as internal parts for refrigeration units.

Rigid polyurethane foam has been used for many years for the manufacture of refrigeration units and other refrigerating equipment because it has excellent heat insulating properties. In refrigerators, the rigid foam is also used as a structural material. The thermal conductivity of the rigid polyurethane foam, which has predominantly closed cells, depends to a large extent on the nature of the blowing agent or cell gas used. Blowing agents such as perhalogenated fluoro-chlorohydrocarbons (FCH), particularly trichlorofluoro-methane (R11) which has an exceptionally low thermal conductivity, have proven to be particularly suitable for the production of rigid polyurethane foams. These perhalogenated fluoro-chlorohydrocarbon materials are chemically inert and therefore non-toxic and incombustible. The stability of these perhalogenated fluoro-chlorohydrocarbons is, however, disadvantageous because they get into the stratosphere, where they contribute to the breakdown of the ozone due to their chlorine content (e.g. Molina, Rowland Mature 249 (1974) 810; First Interim Report of the Enquiry Commission of the German Federal Parliament "Vorsorge zum Schutz der Erdatmosphäre" (Provisions for the Protection of the Earth's Atmosphere" of 02.11.1988, German Federal Parliament, Publicity Department, Bonn).

SUMMARY OF THE INVENTION

It is an object of the present invention to provide a new process for the production of back foamed internal plastics useful for refrigeration units in which perhalogenated fluoro-chlorohydrocarbons are not employed without significant reduction of the thermal insulation properties of the refrigeration unit.

This and other objects which will be apparent to those skilled in the art are accomplished by applying to the internal walls of the part into which the foam forming mixture is to be poured a coating selected from one-component, cross-linkable lacquers, two-component cross-linkable lacquers and aqueous polyurethane dispersions. The foam forming mixture which is composed of a polyisocyanate, an isocyanate-reactive compound and a partially halogenated hydrocarbon having at least one carbon-hydrogen bond and a boiling point of from about −50° to about 50° C. is then poured into the part and the foam is allowed to form and set.

DETAILED DESCRIPTION OF THE INVENTION

The present invention relates to a process for producing insulating foams for refrigeration units in which perhalogenated fluoro-chlorohydrocarbons need not be employed.

A key feature of the present invention is the use of reaction mixtures which react to form polyurethane foams and contain, as blowing agent, a partially halogenated hydrocarbon which contains at least one carbon-hydrogen bond. Initial attempts to use these blowing agents which have a significantly lower ozone damaging potential than the traditional perhalogenated compounds, failed because the deep drawn plastics films or panels based on acrylonitrile/butadiene/styrene copolymers (ABS) or on styrene/butadiene copolymers (SB) commonly used to manufacture the internal walls of refrigerators do not have sufficient resistance to these partially halogenated hydrocarbons. Partially halogenated hydrocarbons are extremely powerful solvents which condense near the internal wall of a refrigerator under operating conditions. Condensed blowing agent is therefore liable to act directly on the material of the internal walls, depending upon the position and frequency of the cavities and may thereby cause serious damage to this material. If, for example, SB is used as the material for the internal walls and 1,1-dichloro-2,2,2-trifluoroethane is used as blowing agent, the dissolving power of 1,1-dichloro-2,2,2-trifluoroethane produces blisters and holes. Tension cracks as well as blisters and holes occur when ABS is used as material for the internal containers.

These difficulties are overcome in the process of the present invention by applying a coat of lacquer which is resistant to the partially halogenated hydrocarbon blowing agents to the walls of the cavity in which back foaming is to be carried out.

The present invention therefore relates to a process for the production of back foamed, deep drawn plastics internal parts for refrigeration units by back foaming the internal parts with a reaction mixture which contains an organic blowing agent and reacts to produce a rigid polyurethane foam. The foam-forming reaction mixture used is one which contains, as blowing agent, a partially halogenated hydrocarbon having at least one carbon-hydrogen bond and boiling in the range of from −50° C. to +50° C., optionally in addition to other blowing agents. The internal walls or cavity of the part in which back foaming is to be carried out are coated on the side which will come into contact with the foam with a coat of lacquer based on a solvent-containing, chemically cross-linking one-component or two-component lacquer or a lacquer based on an aqueous polyurethane dispersion before back foaming is carried out.

The internal parts for refrigeration units which are to be back foamed in accordance with the process of the present invention are plastic internal parts of housings, doors or lids of refrigerators and freezers which are generally produced by deep drawing thermoplastic synthetic resin (preferably ABS or SB) films or panels. For the manufacture of refrigeration units, these internal parts are back foamed with a reaction mixture which reacts to produce a rigid polyurethane foam. Key features of the present invention are therefore the use of reaction mixtures containing special blowing agents to produce rigid foams and the coating of the cavity walls for the internal parts with a coat of lacquer to protect those walls from the solvent action of the blowing agents.

The rigid polyurethane foams are produced from chemical systems composed of conventional polyisocyanates, conventional polyisocyanate-reactive materials, conventional additives and processing aids. However, instead of the perhalogenated hydrocarbons (such as trichlorofluoro-methane) conventionally used as blowing agents, partially halogenated hydrocarbons which boil in the temperature range of from about −50° C. to about 50° C., preferably from about 10° C. to about 35° C., under a pressure of 1013 mbar and contain at least one carbon-hydrogen bond are used. Examples of suitable blowing agents of this type include: 1,1-dichloro-2,2-trifluoroethane (H-FCKW 123), 1,1-dichloro-1-fluoroethane (H-FCKW 141b) and chlorodifluoromethane (H-FCKW 22). H-FCKW 123 and 141b are preferred and H-FCKW 123 is most preferred.

The conventional components of the reaction mixture used to produce the rigid foam are disclosed in the relevant literature such as "Kunststoff-Handbuch", Volume 7, "Polyurethane", Carl Hanser Verlag, Munich, Vienna (1983), pages 246 et seq.

The reaction mixtures used in the process of the present invention to produce rigid polyurethane foams are preferably composed of a) a polyisocyanate, b) an organic polyhydroxyl compound, c) a blowing agent and d) auxiliary agents and additives. The polyisocyanate a) may be any one or more of the conventionally used polyisocyanates with polyisocyanate mixtures of the diphenylmethane series (MDI) having a viscosity of from 50 to 2000, preferably from 100 to 300 mPa.s (25° C.) and an isocyanate functionality of from 2.5 to 3.2 being particularly preferred. The polyhydroxyl compound b) used is preferably a polyether polyol having an average hydroxyl functionality of from 3 to 6, preferably from 4 to 5.5, and a hydroxyl number of from 200 to 600, preferably from 300 to 500. The blowing agent c) is a partially halogenated hydrocarbon of the type described above. The auxiliary agents and additives d) include, for example, conventional activators, foam stabilizers and flame retardants. Isocyanate indexes of from 100 to 120 are generally maintained in the reaction mixture. The specific chemical composition of the foam-forming reaction mixture with the exception of the blowing agent is not critical to the process of the present invention.

The deep drawn plastic internal parts are covered with a coat of lacquer on the side which will come into contact with the foam before back foaming is carried out. This lacquer coat may be based either on an aqueous polyurethane dispersion or on a chemically cross-linking one- or two-component binder used as a solution in organic solvents. It is preferred to use lacquers which give rise to lacquer films having a stretchability at room temperature of at least 15%.

Aqueous polyurethane dispersions useful as the lacquer coating, either alone or in a mixture with known auxiliary agents and additives are described, for example, in U.S. Pat. Nos. 4,190,566 and 4,237,264.

Suitable coating compositions based on chemically cross-linking two-component binders include the known two-component polyurethane lacquers and amine-cross-linkable polyepoxide resin lacquers.

The two-component polyurethane lacquers which are particularly preferred for the present invention are based on two-component binders which generally include a) a polyisocyanate component and b) a polyol component.

The polyisocyanate component a) may in principle be any conventional polyisocyanate but modified polyisocyanates based on simple diisocyanates such as 2,4- and 2,6-diisocyanato-toluene (TDI), 4,4'-diisocyanatodiphenylmethane (MDI), 1,6-diisocyanatohexane (HDI) or isophorone diisocyanate (IPDI) are preferred. Polyisocyanates based on TDI and containing urethane groups such as the reaction product of 2,4-diisocyanatotoluene with trimethylolpropane, isocyanurate-containing polyisocyanates based on IPDI and/or HDI, and biuret-containing polyisocyanates based on HDI are particularly preferred. The isocyanate content of the polyisocyanate component a) is preferably from 10 to 25% by weight.

The polyhydroxyl compound b) may be any of the known polyester polyols, polyether polyols and/or polyacrylate polyols. The polyhydroxyl compounds generally contain more than 2% by weight, preferably from 3 to 5% by weight of hydroxyl groups.

The two-component binders contain polyisocyanates and polyhydroxyl compounds in quantities corresponding to an NCO/OH equivalent ratio of from 0.7:1 to 5:1, preferably from 0.9:1 to 2:1, especially from 1:1 to 1.5:1.

The two-component polyurethane lacquers are worked up from organic solution. Suitable solvents include those which are capable of dissolving the lacquer but have little or no dissolving effect on the plastics internal part which is to be coated with the lacquer. Specific examples of appropriate solvents are mixtures of solvents such as ethyl acetate, butyl acetate, toluene, xylene, methyl ethyl ketone or methyl isobutyl ketone with volatile alcohols such as isopropanol, ethanol, n-butanol or preferably diacetone alcohols. The alcoholic solvents mentioned as examples are used here only as solvent components for dissolving the polyhydroxyl components. When reactive alcohols such as isopropanol, ethanol or n-butanol are used, the mixture of polyisocyanate and polyhydroxyl component must be worked up as soon as it has been prepared so that the volatile alcohol will evaporate from the lacquer film before the isocyanate addition reaction can take place to any significant extent. Diacetone alcohol, which is less powerful in its reaction, allows for a much wider margin since virtually no chemical reaction takes place at room temperature between the preferred aliphatic polyisocyanates and this less reactive alcohol. The inclusion of the alcoholic solvent in the solvent mixture serves to reduce the corrosive action of the solvent mixture on the synthetic resin materials.

The two-component polyurethane lacquers may contain the usual auxiliary agents and additives employed in lacquer technology, such as catalysts for the NCO/OH reaction, pigments, fillers, levelling agents, and the like.

Examples of other chemically cross-linking lacquers for coating the plastics internal parts include those based on amine-cross-linkable polyepoxide resins, those based on melamine resin-cross-linkable polyester resins and those based on physically drying polyurethanes which are dissolved in organic solvents and to which cross-linking agents (e.g., lacquer polyisocyanates of the type exemplified above) have been added to increase the cross-linking density.

One-component lacquers which undergo chemical cross-linking under the influence of atmospheric moisture and contain known types of isocyanate-containing prepolymers as binders are also suitable coatings. Details with respect to the composition of such one-component lacquers may be found in the relevant literature (see, e.g., "Kunststoff-Handbuch", Volume 7, "Polyurethane", publishers Carl Hanser Verlag, Munich, Vienna (1983) pages 545 et seq).

Coating of the internal cavity of the plastic parts with the coating compound in accordance with the present invention may be carried out by any of the methods known and used by those skilled in the art of coating technology. Spraying is a preferred method.

Pretreatment of the plastic internal parts to be coated is generally not necessary but the surfaces to be coated may be cleaned with mild solvents such as cleaning petrol/alcohol mixtures to remove traces of fat.

Back foaming of the plastic internal parts coated with lacquer is carried out in known manner using known apparatus commonly employed for this purpose. More detailed information concerning back foaming procedures is disclosed in the relevant literature (see, e.g., "Kunststoff-Handbuch", Volume 7, "Polyurethane", publishers Carl Hanser Verlag, Munich, Vienna (1983) pages 250 et seq, in particular pages 256 et seq).

Having thus described our invention, the following Examples are given as being illustrative thereof. The percentages given in these Examples are percentages by weight, unless otherwise indicated.

EXAMPLES

The following starting materials were used in the Examples given below:

Polyol I:
80% Solution in butyl acetate of a polyester polyol of isophthalic acid, adipic acid, hexane-1,6-diol and trimethylol propane in a molar ratio of 3:1:4:1, hydroxyl group content of the solution=3.4%.

Polyol II:
65% Solution in butyl acetate/xylene (ratio by weight=3:1) of a polyhydroxy polyacrylate of 33% hydroxyethyl methacrylate, 1% acrylic acid, 25% butyl acrylate and 41% styrene; hydroxyl group content of the solution: 2.8%.

Polyisocyanate I:
75% Solution in methoxy propylacetate/xylene (1:1) of a biuret polyisocyanate based on 1,6-diisocyanatohexane. Isocyanate content of the solution: 16.5%.

Test for examining the resistance of synthetic resin materials to organic blowing agents.

The test described below (condensation test) was developed to ascertain the action of organic blowing agents on synthetic resin materials of the kind used for the manufacture of refrigeration units.

The following apparatus was used to simulate the effect produced by condensation of the blowing agent:

A flat sample of the synthetic resin material was placed between two glass tanks placed one above the other. Blowing agent was introduced into the lower glass tank to an extent of at most 10% of the volume of the tank while ice water was introduced into the upper tank.

Due to the high vapor pressure of the blowing agent at room temperature, the gaseous phase in the lower tank was saturated with the vapor of the blowing agent. Since the sample of synthetic resin material was cooled by the bottom of the tank of ice water above it, the vapor of the blowing agent condensed on the surface of the sample. The action of the condensed blowing agent vapor on the surface was assessed visually.

Example 1

An ABS plate measuring 200×300 mm was coated with a pigmented two-component lacquer by spraying and force dried at 80° C.

Component I of the coating compound was made up of 16.7 parts by weight of Polyol I, 20.0 parts by weight of Polyol II, 0.9 parts by weight of a 10% zinc octoate solution in toluene, 22.8 parts by weight of titanium dioxide pigment (rutile), 4.2 parts by weight of a commercial antisettling agent (10% solution in xylene of Bentone available from Kronos Titan GmbH, D-5090 Leverkusen) and 29.1 parts by weight of a solvent mixture of diacetone alcohol and ethyl acetate (ratio by weight=1:1).

Component II of the coating agent was made up of 21.2 parts by weight of Polyisocyanate I (75% solution). The composition of the coating agent had an NCO/OH equivalent ratio (not including the virtually unreactive hydroxyl groups of the solvent) of 1.3:1.

When the plate had been coated with coating compound and dried, it was subjected to the resistance test described above. The test result is shown in Table 1.

Example 2

Example 1 was repeated with the exception that a clear lacquer corresponding in its composition to the lacquer of Example 1 with the exception that no titanium dioxide pigment and no antisettling agent were included was used. The resistance test result is shown in Table 1.

Example 3

Example 2 was repeated with the exception that a larger quantity of polyisocyanate was used so that the equivalent ratio of isocyanate groups to hydroxyl groups (not including the virtually unreactive hydroxyl groups of the solvent) was 1.5:1.

TABLE 1

| Example | Duration of test (min) | Assessment* |
|---|---|---|
| Comparison (ABS uncoated) | 9 | 3–4 |
| 1 | 120 | 1–2 |
| 2 | 120 | 1–2 |
| 3 | 120 | 1 |

*1 = no action,
2 = slight swelling,
3 = swelling,
4 = severe blistering,
5 = solution/cracks Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a back foamed, deep drawn plastic part having internal and external walls which is useful as an internal part for a refrigeration unit comprising
   a) applying to the internal walls of the part in which the foamed plastic is to be back foamed a two-component polyurethane lacquer as a coating material,
   b) pouring into the part in which back foaming is to be carried out a foam forming reaction mixture comprising a polyisocyanate, an isocyanate-reactive compound and a partially halogenated hydrocarbon having at least one carbon-hydrogen bond and a boiling point in the range of from about about −50° C. to about 50° C. and
   c) allowing the foam to form and set.

2. A process for the production of a back foamed, deep drawn plastic part having internal and external walls which is useful as an internal part for a refrigeration unit comprising
   a) applying to the internal walls of the part in which the foamed plastic is to be back foamed an amine cross-linkable polyepoxide resin coating material,
   b) pouring into the part in which back foaming is to be carried out a foam forming reaction mixture comprising a polyisocyanate, an isocyanate-reactive compound and a partially halogenated hydrocarbon having at least one carbon-hydrogen bond and a boiling point in the range of from about −50° C. to about 50° C. and
   c) allowing the foam to form and set.

* * * * *